United States Patent [19]

Oue et al.

[11] Patent Number: 5,448,288
[45] Date of Patent: Sep. 5, 1995

[54] AUTOMATIC ADJUSTMENT CIRCUIT FOR ANALOG CONTROL UNIT

[75] Inventors: Noboru Oue; Yoshitsugu Nagata; Hiroshi Otobe, all of Fukui, Japan

[73] Assignee: Orion Electric Co., Ltd., Fukui, Japan

[21] Appl. No.: 51,303

[22] Filed: Apr. 23, 1993

[51] Int. Cl.6 .............................................. H04N 17/04
[52] U.S. Cl. ................................... 348/190; 348/184; 348/678
[58] Field of Search ............... 358/174, 172, 168, 169, 358/139; H04N 5/52, 5/57, 17/00, 17/02, 17/04; 348/678, 679, 680, 681, 682, 682, 683, 684, 685, 686, 687, 695, 696, 697, 180, 189, 190, 177, 184

[56] References Cited

U.S. PATENT DOCUMENTS

| | | | |
|---|---|---|---|
| 4,178,608 | 12/1979 | Shirato | 348/645 |
| 4,270,145 | 5/1981 | Farina | 358/188 |
| 4,625,240 | 11/1986 | Yablonski et al. | 348/682 |
| 4,654,717 | 3/1987 | Stoughton | 358/168 |
| 4,724,364 | 2/1988 | Newton | 358/169 |
| 4,952,917 | 8/1990 | Yabuuchi | 358/168 |
| 4,999,703 | 3/1991 | Henderson | 358/139 |
| 5,081,523 | 1/1992 | Frazier | 358/139 |
| 5,193,223 | 3/1993 | Walczak et al. | 455/115 |
| 5,194,822 | 3/1993 | Bureau et al. | 348/678 |
| 5,216,504 | 6/1993 | Webb et al. | 358/139 |
| 5,233,419 | 8/1993 | Lee | 358/139 |
| 5,241,384 | 8/1993 | Maetani | 358/139 |
| 5,260,784 | 11/1993 | Kamiyama et al. | 358/139 |

FOREIGN PATENT DOCUMENTS

| | | | |
|---|---|---|---|
| 54-19323 | 2/1979 | Japan | 358/174 |
| 178878 | 10/1984 | Japan | 358/174 |
| 215116 | 9/1988 | Japan | H03M 1/10 |
| 1165230 | 6/1989 | Japan | |
| 118526 | 5/1991 | Japan | 358/174 |
| 5064103 | 3/1993 | Japan | H04N 5/57 |

Primary Examiner—James J. Groody
Assistant Examiner—Chris Grant
Attorney, Agent, or Firm—Wenderoth, Lind & Ponack

[57] ABSTRACT

An automatic adjustment circuit for an analog control unit comprising a detection circuit and a D/A control circuit, said detection circuit being connected to said analog control unit to detect gain errors in said analog control unit and to input a determination signal for the determination of the errors detected to a control microcomputer installed in the apparatus and said D/A control circuit is operated in response to receiving signal from said control microcomputer to accomplish the adjustment.

13 Claims, 5 Drawing Sheets

ADJUST   AUTO/MANUAL

AUTOMATIC ADJUSTMENT CIRCUIT FOR ANALOG CONTROL UNIT

BACKGROUND OF THE INVENTION

1. Field of the Invention

This invention relates to an automatic adjustment circuit for an analog control unit which electronically performs automatic control of gain errors which occur in an analog control unit such as a video intermediate frequency amplification circuit (VIF circuit) or a sound intermediate frequency amplification circuit (SIF circuit) provided in an electronic apparatus such as a television receiver (TV).

2. Prior Art

In a VIF circuit of a TV set for example, an automatic gain control circuit (AGC circuit) is provided which supplies negative feedback of voltage to a TV tuner so that a detection output remains constant even where an input level received by a TV antenna varies. However, TV tuners and VIF circuits have their own gain errors and errors also occur in the AGC voltage. Conventionally, these gain errors were adjusted by changing an adjustment point of the AGC circuit by a semifixed resistor 24 provided in the VIF circuit 2 as shown in FIG. 9. Ordinarily, this adjustment was performed by adjusting the semifixed resistor 24 on the TV production line either manually by a worker or mechanically using a factory automation apparatus.

However, this adjustment is one of very intricate processes to be performed on the production line, and besides the preciseness of adjustment is not fully reliable, so that said adjustment is not preferable for mass production of good products.

Said adjustment is required not only for TV VIF circuits but also for other blocks of a TV such as SIF circuits, stereo circuits, character broadcast receiving circuits as well as for various types of analog control units used for other household and office appliances. Accordingly there is a great demand for a adjustment circuit which can automatically adjust for the errors of analog control units in a more simple and efficient manner.

SUMMARY OF THE INVENTION

It is therefore an object of the present invention to provide an automatic adjustment circuit for an analog control unit which requires no manual or mechanical adjustment on a production line for electronic appliances such as television receivers etc., which can perform precision adjustment in a simple manner and which can improve production efficiency.

In the present invention the adjustment of errors in an analog control unit is performed by providing a detection circuit, which detects gain errors in the analog control unit, either outside or inside a TV or other electronic appliances having the analog control unit, inputting determination signals detected by the detection circuit into a control microcomputer equipped in an electronic appliance and operating a D/A control circuit in accordance with a command from the control microcomputer.

Though there is no particular limitation regarding the control microcomputer, it is desirable that, in the case of a television receiver, for example, input/output terminals or equivalent terminals of a control microcomputer which has been employed for channel selection or brightness control etc. be made available. The command from the control microcomputer is carried out by reading out a control program written in a memory unit or device.

In the case of a television receiver, analog control units are used as shown in the following table.

In accordance with the present invention, the gain errors of the analog control unit in the electronic apparatus can be performed electronically and automatically, not manually or mechanically, so that higher precision of adjustment and higher production efficiency can be obtained. As a result, mass productivity of good products is increased. Moreover, since the adjustment is performed by a control microcomputer equipped in the apparatus, there is no need to use a complicated FA instrument, so that the simplest and most efficient adjustment can be performed.

| TV Block | Adjustment section | Element |
| --- | --- | --- |
| Video intermediate frequency amplification circuit (VIF) | Detection coil | Coil |
| | Automatic fine tuning coil (AFT coil) | Coil |
| | Automatic gain control VR (AGC VR) | Semifixed resistor |
| | Channel trap coil | Coil |
| | Saw matching coil | Coil |
| Sound intermediate frequency amplification circuit (SIF) | Detection coil | Coil |
| | SIF level control VR | Semifixed resistor |
| Stereo circuit | Voltage control oscillator VR (VOC VR) | Semifixed resistor |
| | Separation VR | Semifixed resistor |
| | Balance VR | Semifixed resistor |
| Character multiplex system (Teletext) | Voltage control oscillator trimmer condenser (VOC VR) | Semifixed resistor |
| Video circuit (tandem filter) | Gain | Semifixed resistor |
| | Phase | Coil |
| CRT driving circuit | Cut off | Semifixed resistor |
| | Drive | Semifixed resistor |
| Chrominance signal demodulating circuit | Automatic phase control (APC) | Voltage control oscillator |
| | SECAM deflecting coil | Coil |
| | SECAM ident coil | Coil |
| | SECAM bell coil | Coil |
| | PAL delay coil | Coil |
| | PAL phase VR | Semifixed resistor |

-continued

| TV Block | Adjustment section | Element |
| --- | --- | --- |
| Deflection circuit | Vertical size VR | Semifixed resistor |
| | Vertical position VR | Semifixed resistor |
| | Horizontal size coil | Coil |
| | Horizontal position VR or trimmer condenser | Semifixed resistor or Trimmer condenser |
| User-controlled supplementary adjustment circuit | Sub bright YR | Semifixed resistor |
| | Sub contrast VR | Semifixed resistor |
| | Sub color VR | Semifixed resisitor |
| | Sub tint VR | Semifixed resistor |
| Power source | +B adjust | Semifixed resistor |
| clock | Clock adjustment | Trimmer condenser |

DETAILED DESCRIPTION OF THE INVENTION

Figure 1:
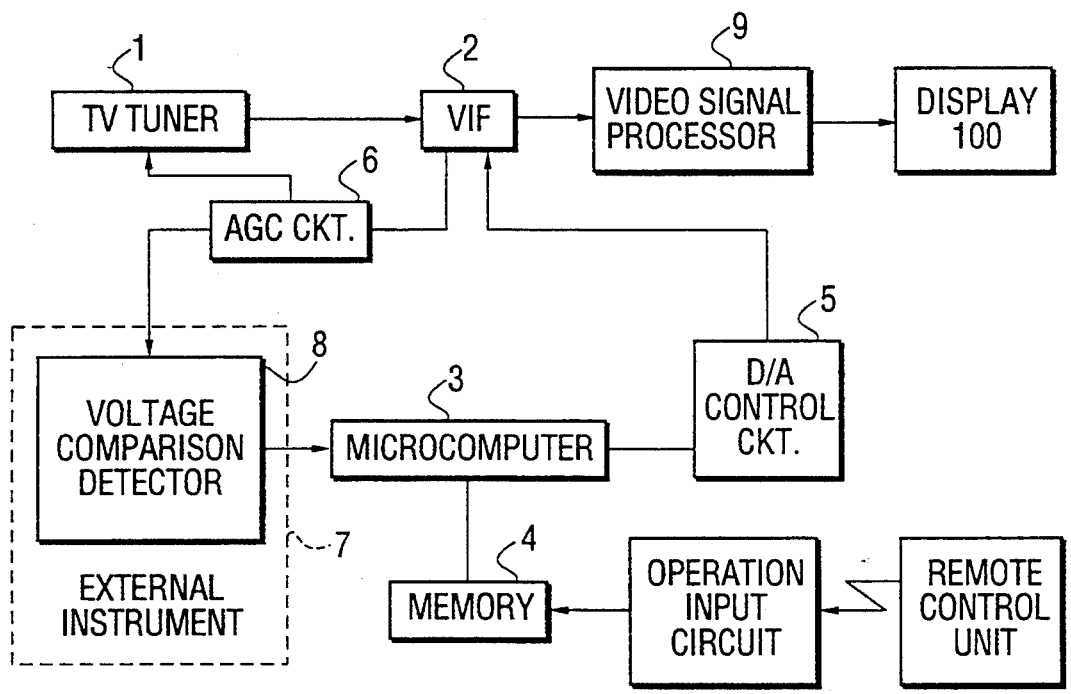
FIG. 1 is a block diagram showing one embodiment of an automatic adjustment circuit in accordance with the present invention, which is applied to the VIF circuit of a television receiver.

FIG. 1 is a block diagram showing one embodiment of an automatic adjustment circuit which is applied to a television VIF circuit.

In the drawing, element 1 is a TV tuner; element 2 is a VIF circuit; element 3 is a control microcomputer used for channel selection, etc.; element 4 is a memory and element 5 is a D/A control circuit. Element 6 is an AGC circuit. Element 7 is an instrument which is provided outside the TV receiver and equipped with a voltage comparison detection circuit 8 and a TV video signal processing circuit 9 and a display 100.

The above circuit operates as follows.

Negative feedback voltage is imposed from the VIF circuit 2 to TV tuner 1 by means of AGC circuit 6 for gain control. When a gain error occurs between the VIF circuit 2 and TV tuner 1, the voltage comparison detection circuit 8 generates a determination signal which corresponds to a error determined by comparing an error voltage and a present standard voltage and said determination signal is input to the control microcomputer 3. Said microcomputer 3 carries out an adjustment control program corresponding to the gain error, and sends an operation signal to the D/A control circuit 5. The D/A control circuit 5 operates by receiving the output from the control microcomputer 3, and adjusts the gain error in the VIF circuit 2. Subsequently, the adjusted data is saved in the memory 4.

Said control microcomputer 3 may be also employed to adjust errors in other circuit. For example, as shown in FIGS. 3(A)-3(B), recent television receivers display a specific indicator on the CRT screen which indicates a standard or regular position of video brightness. The video signal processing circuit 9 and the brightness/contrast control circuit 10 are set correctly, but variations or errors may occur Conventionally, adjustment was made mechanically by means of semifixed resistor as in the case of the VIF circuit. The automatic adjustment circuit in accordance with the present invention can be also applied to the video signal processing circuit 9 as shown in FIG. 2.

Figure 2:
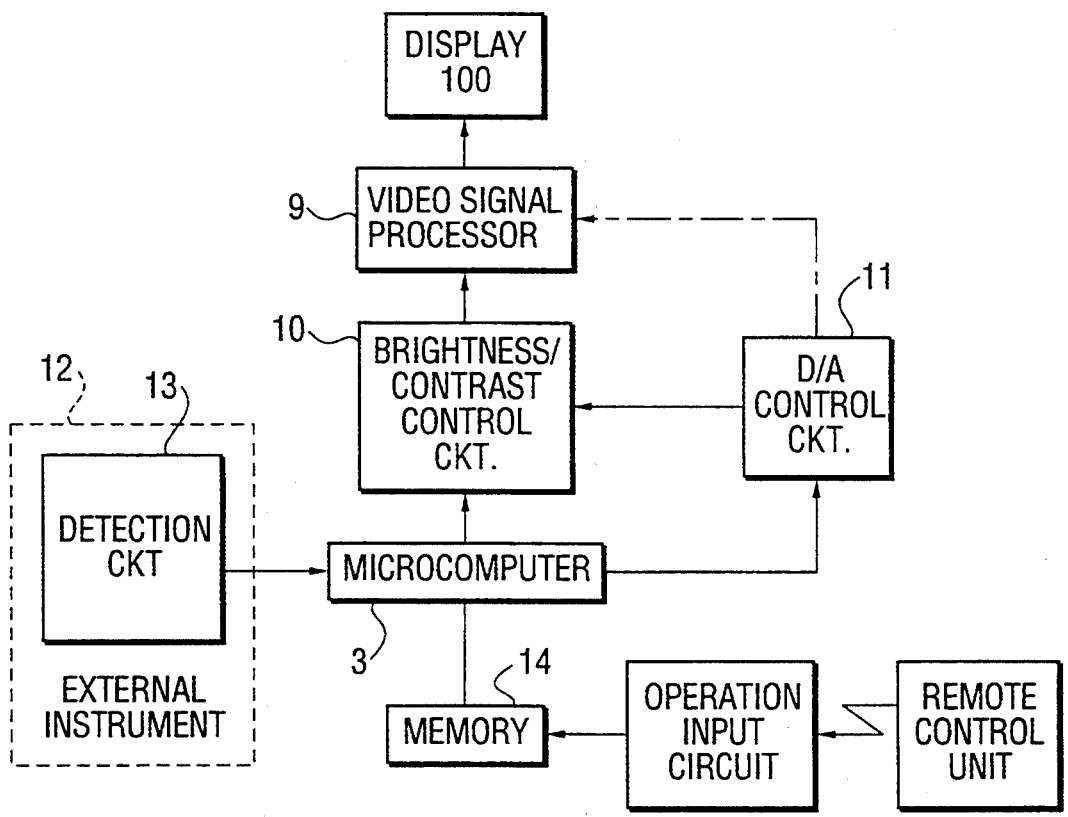
FIG. 2 is a block diagram showing another embodiment of an automatic adjustment circuit in accordance with the present invention, which is applied to a TV video signal circuit.
Figure 3A:
FIGS. 3(A)-3(B) are CRT displays showing a standard video position.
Figure 3B:
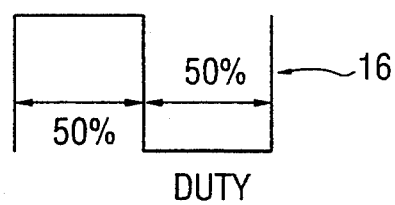

In FIG. 2, element 9 is a video signal processing circuit; element 10 is a brightness/contrast control circuit; element 11 is a D/A control circuit; element 12 is a instrument, and element 13 is a detection circuit. Element 3 is a control microcomputer same as in the previous embodiment and element 100 is a display. The detection circuit 13 detects either a error voltage from brightness/contrast control circuit 10 or the brightness or contrast level from the CRT screen (i.e. -the display 100) via a light sensor, and it generates a determination signal after making a comparison of the detection value with a standard value.

The determination signal is sent to the control microcomputer 3 so as to output an operation signal to D/A control circuit 11 for the adjustment of the error. As a result, the brightness/contrast control circuit 10 is adjusted in response to the operation of D/A control circuit 11. The D/A control circuit 11 is directly connected to the brightness/contrast control circuit 10, but the brightness and contrast may be also adjusted by connecting the D/A control circuit 11 directly to the video signal processing circuit 9, as shown by the phantom line in the drawing, so as to control the gain of video signal processing circuit 9.

Additional program modes of the microcomputer can be divided into two types. One is a TV operation mode which can be operated by a user, namely TV purchaser, himself, and another is an adjustment mode which is operated by a line operator, repairman, service man etc.

In the TV operation mode, the user may adjust brightness and contrast by operating the UP/DOWN button on the remote control unit while watching the TV screen displaying scale 15 as shown in FIG. 3 (A). In order to present the optimum video condition desired by the user when the point indicated on the scale is located in the center, a line operator adjusts the operation signal output which is applied from the control microcomputer 3 to the brightness/contrast circuit 10 so that the duty of the positive half cycle and that of the negative half cycle of the pulse modulation output waveform (PWM output) 16 of the operation signal output become identical. Then the user's operation of the UP/DOWN button on the remote control unit changes the positive/negative duty ratio of PWM output waveform 16 and consequently adjusts the brightness and contrast.

In the adjustment mode, on the other hand, as shown in FIG. 2, adjustment is performed by inputting the operation signal output of the microcomputer 3 directly into the brightness/contrast circuit 10.

A line operator adjusts the operation signal output so that the optimum video condition can be obtained when the brightness indicator is positioned at the center of the scale, as in the case of the above TV operation mode. However, the D/A control circuit 11 is not used, and then even if the positive/negative duty ratio of PWM output waveform of microcomputer 3 is adjusted to be identical, the optimal video condition desired may not always be obtained due to gain errors in either the video signal processing circuit 9 or the brightness/contrast circuit 10, depending on the TV unit. In this case, the desired optimal video condition is established by intentionally shifting the positive/negative duty ratio of the PWM output from microcomputer 3 to brightness/contrast circuit 10. In other words, adjustment is made by setting the PWM output of microcomputer 3 to, for example, a positive/negative duty ratio of 40% to 60%, depending on the degree of shift in brightness, without changing the center position of the scale shown in FIG. 3(A). In a TV receiver thus adjusted, an excess or lack of brightness occurs at the maximum or minimum adjustment position far away from the center of the scale when the user changes the brightness using the remote control unit. But, no particular influence and trouble are experienced as long as said change is made within the range of regular adjustment.

The adjustment mode may be so arranged that the user can control it at his option. Furthermore said mode may be also applied to adjust contrast, darkness of color and tint other than brightness.

Hereinafter, the detailed structure and operation of the automatic adjustment procedure are explained in accordance with the embodiments.

Figure 4:
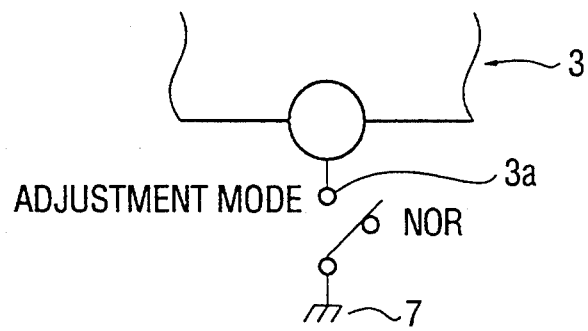
FIG. 4 is a schematic view showing a hard board type of an adjustment mode switching circuit.
Figure 5:
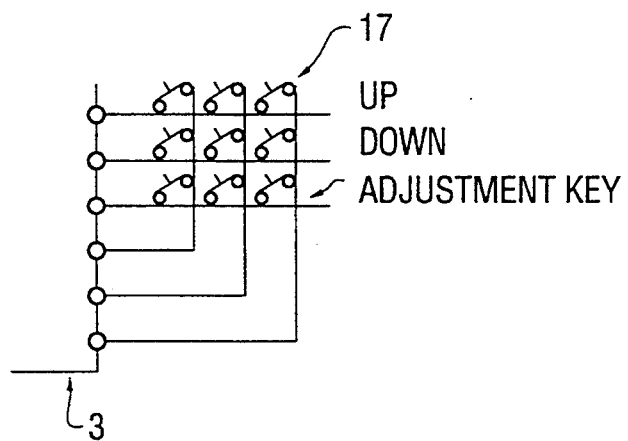
FIG. 5 is a schematic view showing a key matrix type of an adjustment mode switching circuit.
Figure 6:
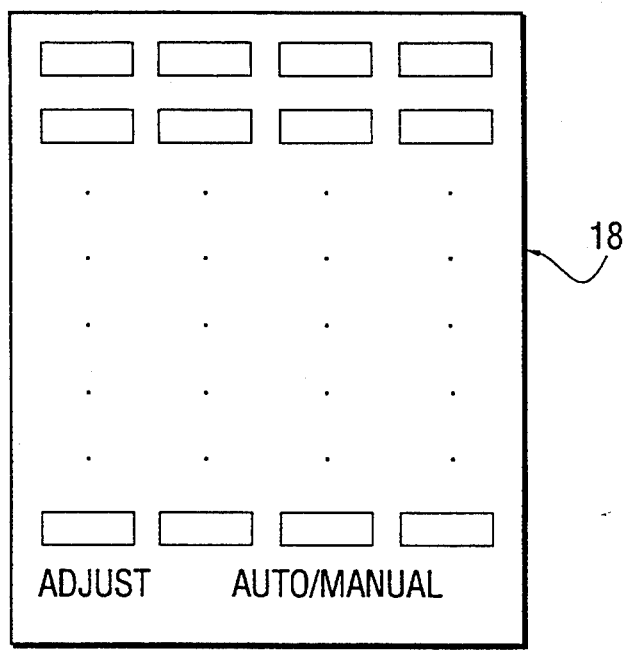
FIG. 6 is a schematic view showing a remote control type of an adjustment mode switching circuit.

A mode changing switch of the microcomputer 3 which selects either the regular TV operation mode or adjustment mode is provided at an adjustment instrument 7 positioned outside the TV receiver and connected to a specific terminal 3a of the microcomputer 3 as shown in FIG. 4, or is provided in an additional fashion along with other key matrix switches 17 installed in the TV body as shown in FIG. 5. It may be also provided at a remote control unit 18 as shown in FIG. 6. The adjustment mode is selected by operating said switch.

Figure 7:
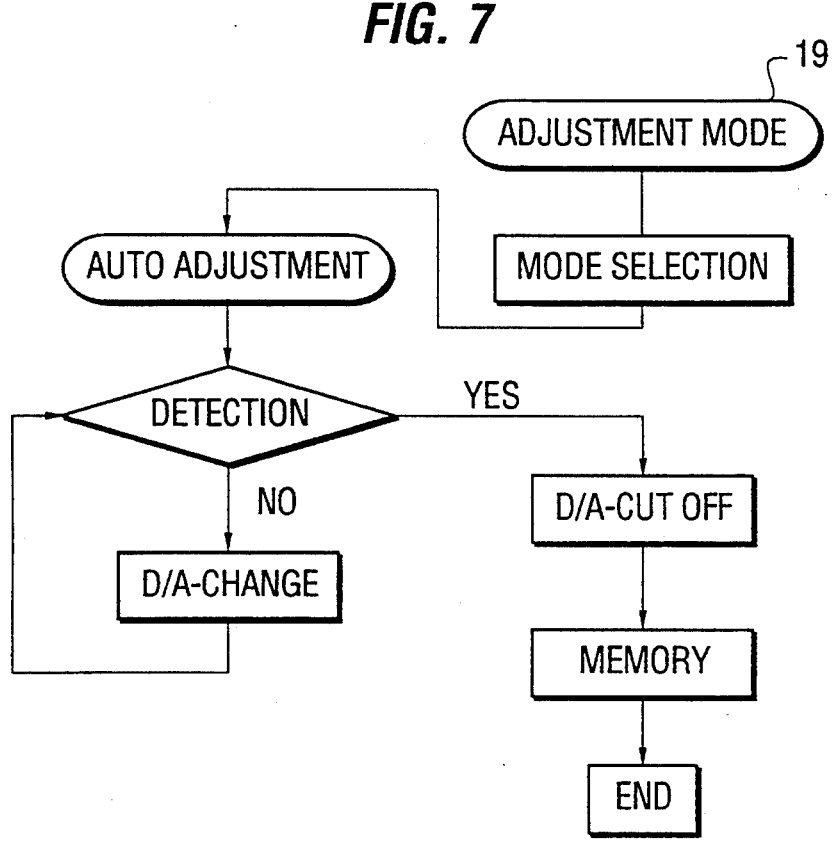
FIG. 7 is a flowchart of the automatic adjustment circuit operation.

The automatic adjustment program procedure is as shown in FIG. 7. When the adjustment mode 19 is selected, input of errors into the microcomputer 3 is carried out through a detection circuit 8 or 13. Until the microcomputer 3 detects that the adjustment is completed, it continues to output the operation signal to a control circuit 5 or 11 to adjust the output of the control circuit.

When the adjustment is completed, the microcomputer 3 outputs an adjustment completion signal to a detection circuit 8 or 13, and stops the output of the operation signal to the control circuit 5 or 11. Then the adjustment data after the completion of adjustment is stored in a memory 4 or 14. Memories 4 and 14 are nonvolatile memories, so that the stored adjustment data is saved even after the TV is turned off.

In order to make it easy for the person performing the adjustment, it is desirable to have the adjustment operation displayed on CRT 23 in the following order as shown in FIGS. 8(A), 8(B), 8(C), and 8(D). Adjustment menu 20 (FIG. 8(A))—Selection of AUTO/MANUAL operation 21 (FIG. 8(B))—Completion of adjustment 22 (FIG. 8(C))—Adjustment mode 20. Menu off (FIG. 8(D)).

Said display on CRT may be replaced by indications using lamps.

Figure 8A:
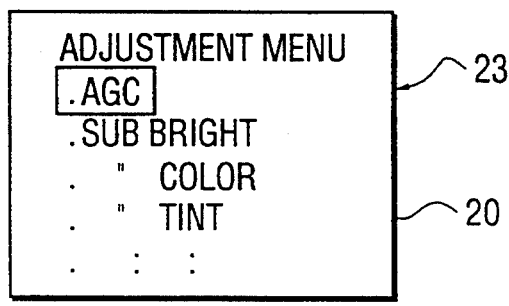
FIGS. 8(A)-8(D) are CRT displays showing an adjustment mode.
Figure 8B:
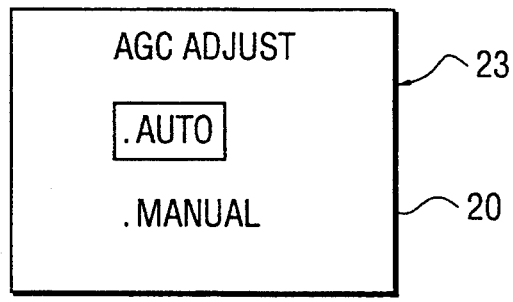
Figure 8C:
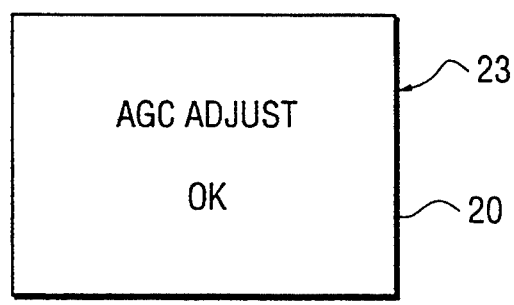
Figure 8D:
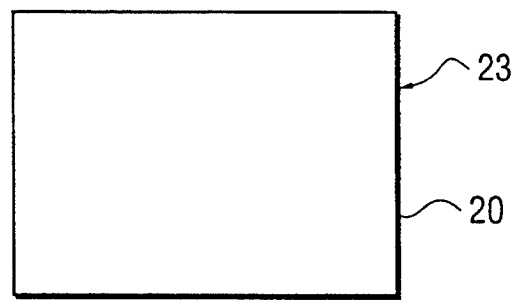
Figure 9:
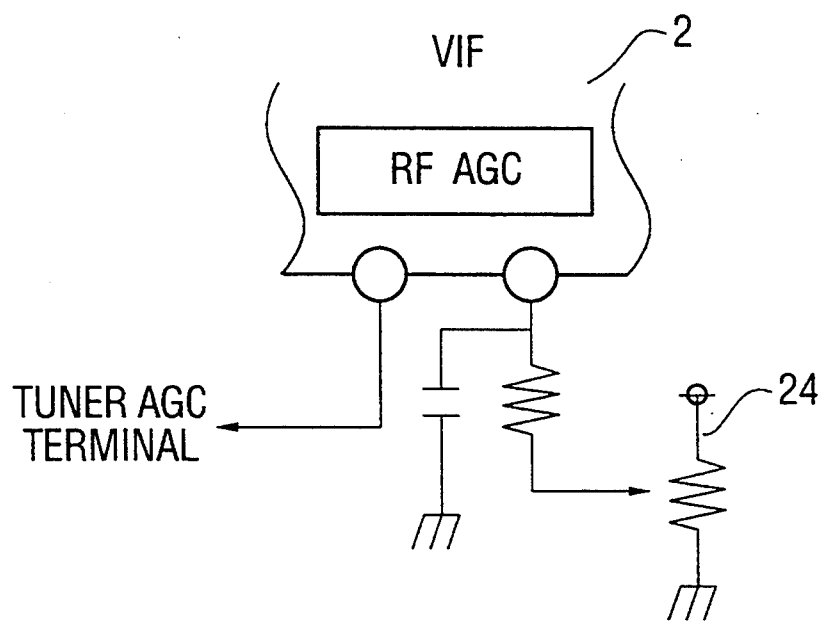
FIG. 9 is a VIF circuit using a conventional semifixed resistor.

In FIG. 8(B) there is a display reading "MANUAL". This is a manual program mode function which is programmed into the microcomputer 3 in advance and is used to make readjustment after the product is delivered to the user. Automatic adjustment is performed so that the microcomputer's functions of detection and control are made automatically, but in the manual adjustment the automatic adjustment program functions of microcomputer 3 are discontinued and the adjustment may be performed manually. Mode selection switch may be prepared. During manual adjustment, adjustment is carried out by increasing or decreasing the output level of control circuits 5 or 11 using the remote control unit or the key operation on the TV unit. This option provides the benefit that readjustment and servicing may be easily performed anywhere.

Incidentally, this invention is not limited to the above embodiments. In particular, in the above embodiments, detection circuit 8 or 13 is provided at instrument 7 or 12 outside the apparatus and gain errors are input from outside the apparatus to control computer 3 inside the apparatus. However, this detection circuit 8 or 13 may also be mounted inside the apparatus so that the automatic adjustment can be made at the apparatus side. It is also possible to provide the circuit on both the instrument and inside the apparatus. Moreover, needless to say, while the above embodiments are directed to a TV receiver, the invention can be also applied to other types of electronic equipment which need similar adjustment.

We claim:

1. An automatic adjustment circuit for an analog control unit contained within an electronic apparatus comprising:
    a control microcomputer contained within the electronic apparatus for controlling said apparatus;
    a voltage comparison detection circuit connected to said analog control unit for detecting gain errors in said analog control unit by comparing an error voltage with a preset standard voltage and for inputting a determination signal in accordance with a determination of the detected gain errors to said control microcomputer; and
    a D/A control circuit operated in response to a receiving signal from said control microcomputer for adjusting the gain error of the analog control unit; wherein said voltage comparison detection circuit is provided within an instrument disposed external to the apparatus.

2. An automatic adjustment circuit as recited in claim 1, further comprising a display operatively connected to the control microcomputer for displaying the adjustment operation.

3. An automatic adjustment circuit as recited in claim 2, wherein said display comprises a CRT display.

4. An automatic adjustment circuit for a VIF circuit contained within a television receiver comprising:
- a control microcomputer contained within the television receiver for controlling said receiver;
- a voltage comparison detection circuit connected to said VIF circuit for detecting gain errors in said circuit by comparing an error voltage with a preset standard voltage and for inputting a determination signal in accordance with a determination of the detected gain errors to the control microcomputer; and
- a D/A control circuit operated in response to a signal from said control microcomputer for adjusting the gain error of said VIF circuit; wherein said voltage comparison detection circuit is provided within an instrument disposed external to the receiver.

5. An automatic adjustment circuit as recited in claim 4, further comprising a display operatively connected to the control microcomputer for displaying the adjustment operation.

6. An automatic adjustment circuit as recited in claim 5, wherein said display comprises a CRT display.

7. An automatic adjustment circuit for a brightness/contrast control circuit used in a television receiver comprising:
- a control microcomputer contained within the television receiver for controlling said receiver;
- a voltage comparison detection circuit connected to said brightness/contrast control circuit for detecting gain errors in said circuit by comparing an error voltage with a present standard voltage and for inputting a determination signal in accordance with a determination of the detected gain errors to the control microcomputer; and
- a D/A control circuit operated in response to a signal from said control microcomputer for adjusting the gain error of said brightness/contrast control circuit; wherein said voltage comparison detection circuit is provided within an instrument disposed external to the apparatus.

8. An automatic adjustment circuit as recited in claim 7, further comprising a display for displaying the adjustment operation.

9. An automatic adjustment circuit as recited in claim 8, wherein said display comprises a CRT display.

10. An automatic adjustment circuit for a brightness/contrast control circuit used in a television receiver comprising:
- a control microcomputer contained within the television receiver for controlling said receiver;
- a voltage comparison detection circuit connected to said brightness/contrast control circuit for detecting gain errors in said circuit by comparing an error voltage with a present standard voltage and for inputting a determination signal in accordance with a determination of the detected gain errors to said control microcomputer;
- said control microcomputer including a means for adjusting a duty cycle of a PWM output of an operation signal output from the control microcomputer to said brightness/contrast control circuit; wherein said voltage comparison detection circuit is provided within an instrument disposed external to the receiver.

11. An automatic adjustment circuit as recited in claim 10, further comprising a display for displaying the adjustment operation.

12. An automatic adjustment circuit as recited in claim 11, wherein said display comprises a CRT display.

13. An automatic adjustment circuit for an analog control unit used in a television receiver comprising:
- a control microcomputer contained within the television receiver for controlling said receiver;
- a voltage comparison detection circuit connected to said analog control unit for detecting gain errors in said analog control unit by comparing an error voltage with a preset standard voltage and for inputting a determination signal in accordance with a determination of the detected gain errors to said control microcomputer;
- a D/A control circuit operated in response to a signal from said control microcomputer for adjusting the gain error of the analog control unit; and
- a display operatively connected to the control microcomputer for displaying the adjustment operation thereon; wherein said voltage comparison detection circuit is provided within an instrument disposed external to the receiver.

* * * * *